(12) United States Patent
Yamahiro

(10) Patent No.: US 6,456,431 B2
(45) Date of Patent: Sep. 24, 2002

(54) STEREOMICROSCOPE AND DARK FIELD ILLUMINATION APPARATUS

(75) Inventor: Tomohiko Yamahiro, Chigasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/748,183

(22) Filed: Dec. 27, 2000

(30) Foreign Application Priority Data

Dec. 28, 1999 (JP) ............................................. 11-374449

(51) Int. Cl.⁷ .......................... G02B 21/06; G02B 21/00
(52) U.S. Cl. ...................... 359/387; 359/368; 359/385
(58) Field of Search .............................. 359/385, 387, 359/867; 362/296, 297, 97

(56) References Cited

U.S. PATENT DOCUMENTS 3,920,311 A * 11/1975 Tsuda et al. ................ 359/387
4,575,788 A * 3/1986 Lewin ........................ 362/297
4,659,193 A * 4/1987 Nagano ...................... 359/387

FOREIGN PATENT DOCUMENTS

| DE | 271-963 A | * | 9/1989 | ................. 359/387 |
| EP | 0182115 A1 | * | 10/1985 | |
| JP | 61-102618 A | | 5/1986 | |
| JP | 5-16567 B | | 3/1993 | |
| JP | 11-153755 A | | 6/1999 | |

* cited by examiner

*Primary Examiner*—Mark A. Robinson
*Assistant Examiner*—Jennifer Winstedt
(74) *Attorney, Agent, or Firm*—Morgan, Lewis & Bockius LLP

(57) ABSTRACT

A stereomicroscope has a dark field illumination apparatus capable of irradiating a subject with the light from a light source at a high efficiency by providing an optical system through which regularly reflected light beams are overlapped with each other by an annular reflective member with less ununiformity of the illumination.

11 Claims, 6 Drawing Sheets

STEREOMICROSCOPE AND DARK FIELD ILLUMINATION APPARATUS

The present application claims the benefit of Japanese Patent Application No. 11-374449 which is hereby incorporated by reference.

BACKGROUND OF THE INVENTION

1. Field of the Invention

The present invention relates to a stereomicroscope and a dark field illumination apparatus used therein.

2. Related Background Art

When observing a subject with a vertical illumination and, a transmission illumination by use of a stereomicroscope, if the subject is a transparent living specimen and a hyperfine structure of a flaw etc of a jewel, there might be a case where a contrast with a background is hard to obtain and the hyperfine structure is hard to distinguish. In such a case, a dark field illumination is used. The dark field illumination involves the use of only scattered light and diffracted light due to the subject as observation light without letting illumination light beam directly incident on an observation optical system, and a periphery of the subject is made to become a dark background, whereby images easy to observe the transparent subject and the hyperfine structure can be obtained.

What is known as a conventional dark field illumination apparatus is disclosed in, for example, Japanese Patent Application Laid-Open Publication No. 61-102618, wherein a light source is disposed at a center of a barrel type toroid mirror, and a light scattering structure is disposed between the barrel type toroid mirror and the light source. Further, Japanese Patent Application Post-Exam Publication No. 5-16567 discloses a dark field illumination apparatus in which an annular reflective member disposed along a periphery of a light source, and numerous number of hairlines are cut in this annular reflective member in a direction parallel to an optical axis. Moreover, Japanese Patent Application Laid-Open Publication No.11-153755 discloses a dark field illumination apparatus in which an annular reflective member is disposed along a periphery of a light source and is formed with a multiplicity of cylindrical curved surfaces extending in a direction parallel to an optical axis. Each of those apparatuses attempts to attain the illumination with no ununiformity by irradiating the sample with the light beam emitted from the light source, which is scattered by the light scattering structure, the hairlines and the cylindrical curved surfaces.

Each of the conventional dark field illumination apparatuses is constructed to illuminate the subject with the scattered light, and yields an advantage that the ununiformity of the illumination is hard to occur. While on the other hand, only a portion of the light beam emitted by the light source falls on the subject, and hence a quantity of the illumination light incident on the subject does not become so large. Consequently, when trying to observe a subject exhibiting small efficiencies of scattering and diffracting the light by the conventional scatter-type dark field illumination, quantities of the scattered light and of the diffracted light are small, with the result that only a dark image is obtained and hard to observe.

SUMMARY OF THE INVENTION

It is a primary object of the present invention, which was devised to obviate the above problems inherent in the prior art, to provide a stereomicroscope having a dark field illumination apparatus capable of irradiating a subject with the light emitted from a light source at a high efficiency and with less ununiformity of illumination.

To accomplish the above object, according to one aspect of the present invention, a stereomicroscope comprises an objective lens, a subject placing surface for placing a subject, and a dark field illumination apparatus disposed in such a position as to face to the objective lens with the subject placing surface being interposed therebetween. The dark field illumination apparatus includes a light source disposed on an optical axis of the objective lens, an annular reflective member for reflecting the light from the light source by its inside surface, and a light shielding plate for cutting off partially light reflected by the annular reflective member. The inside surface of the annular reflective member takes such a configuration that a plurality of reflecting surfaces each taking a concave shape having a predetermined radius of curvature are disposed in an annular shape with the optical axis being centered within a plane perpendicular to the optical axis, and the optical axis is positioned between the plurality of reflecting surfaces and centers of the curvatures thereof.

DESCRIPTION OF THE PREFERRED EMBODIMENTS

Embodiments of the present invention will hereinafter be described with reference to the accompanying drawings (First Embodiment)

A stereomicroscope provided with a dark field illumination apparatus in a first embodiment of the present invention, will be explained.

Figure 5:
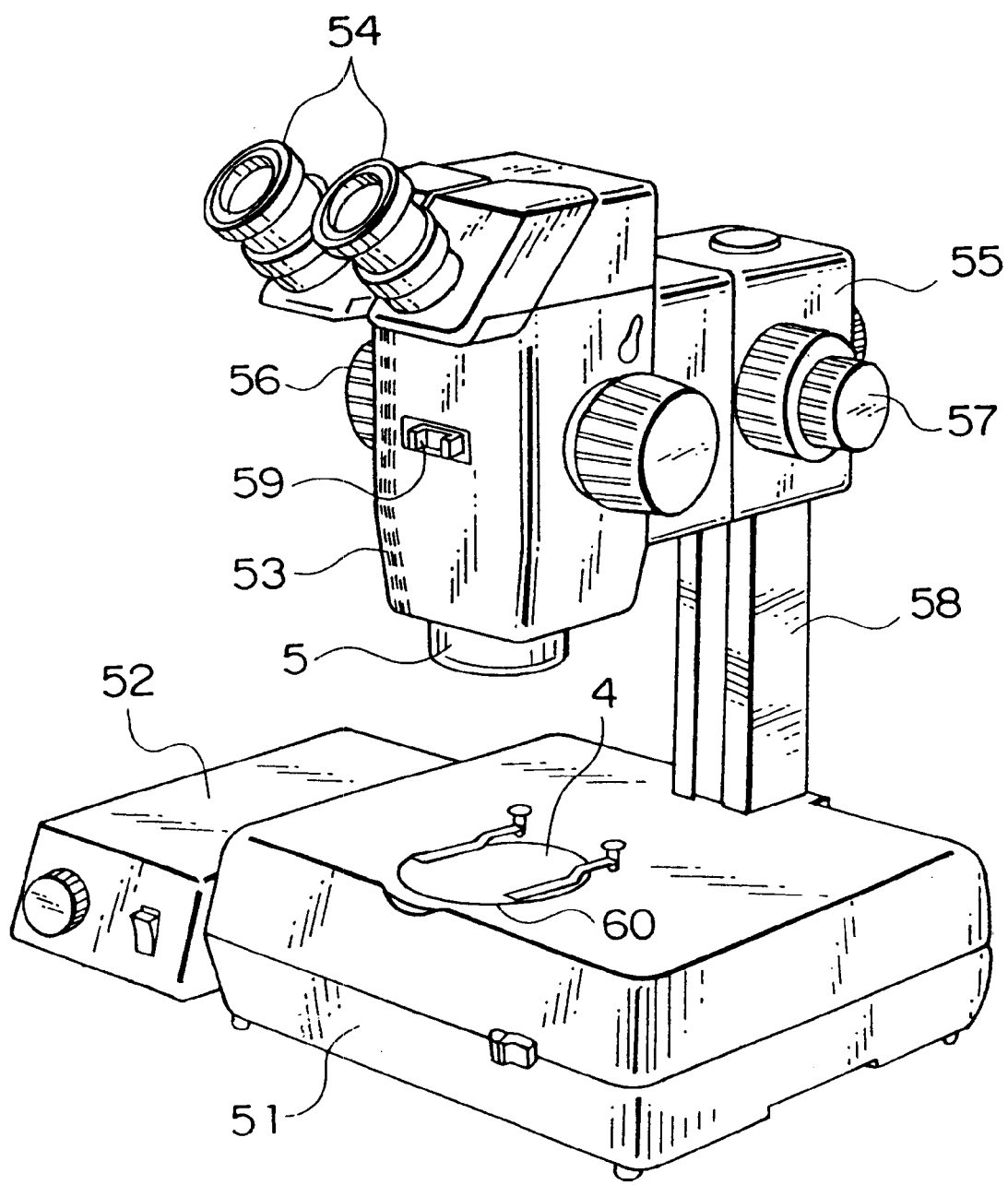
FIG. 5 is a perspective view showing the stereomicroscope in the first embodiment.

The stereomicroscope in the first embodiment, as shown in FIG. 5, includes a base 51 having a built-in dark field illumination apparatus, an objective lens 5, a zoom lens barrel 53, eyepieces 54, and a focusing device 55. A window 60 inset with a transparent member is provided in a part of an upper surface of the base 51. An upper surface of this window 60 serves as an inspected surface 4 on which a subject is placed.

Zoom lens units (unillustrated) for left and right eyes and image forming lens units (not shown) are respectively disposed inside the zoom lens barrel 53. A zooming knob 56 is provided outwardly of the barrel. The zoom lens unit includes a movable lens for zooming. This zooming movable lens is moved in a direction of an optical axis with rotations of the zooming knob 56. Further, the zoom lens unit contains a variable stop. A slider switch 59 for adjusting this variable stop is attached to the zoom lens barrel 53.

Further, the focusing device 55 has a forcusing knob 57, and a mechanism (not shown) for vertically moving the zoom lens barrel 53 along an axis 58 with the rotations of the knob 57. The objective lens 5 and the eyepieces 54 are fixed to the zoom lens barrel 53 and therefore move vertically integrally with the zoom lens barrel 53.

Figure 1:
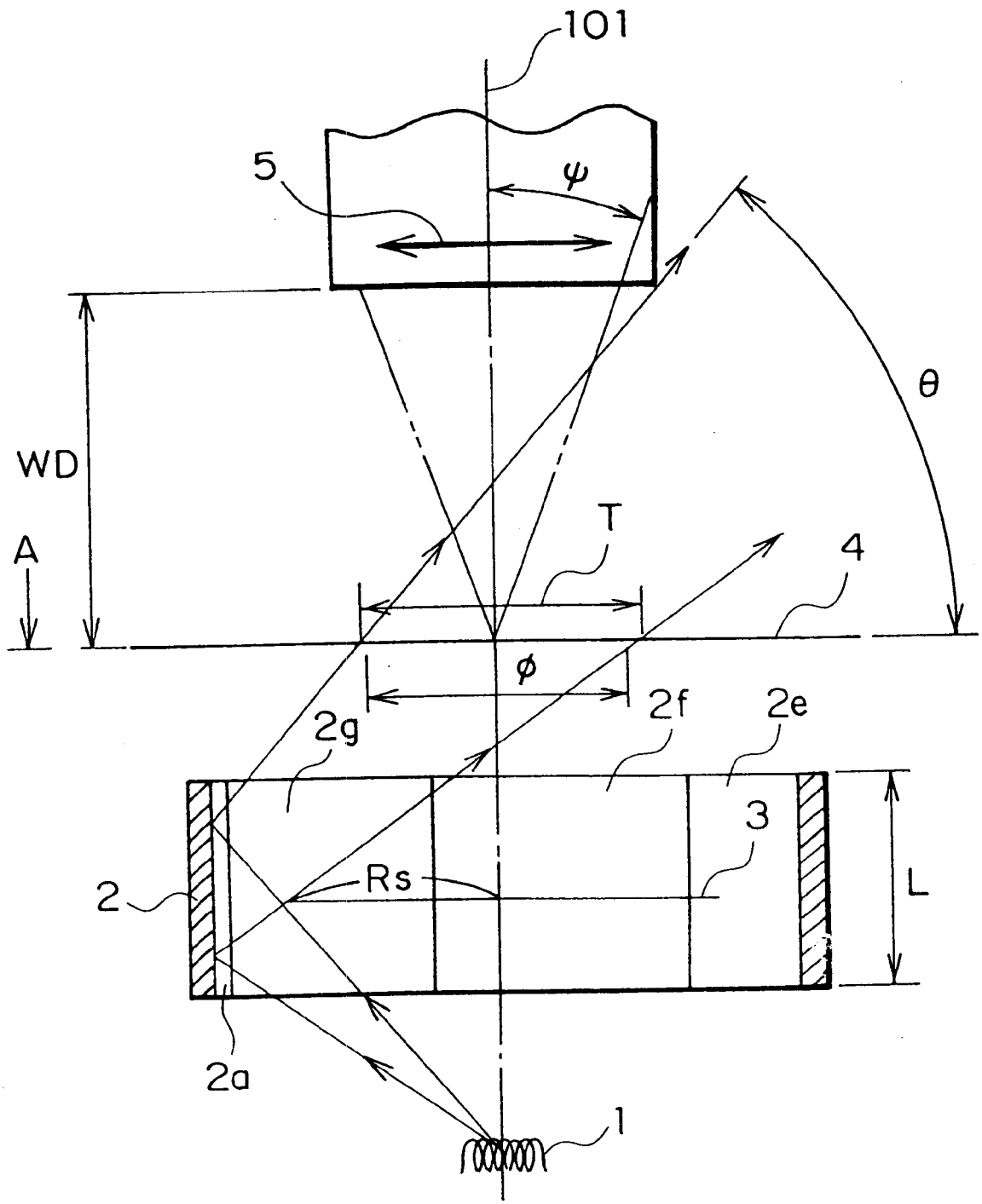
FIG. 1 is an explanatory view showing a configuration and light beam, as viewed from a plane including an optical axis 101, of a dark field illumination apparatus of a stereomicroscope in a first embodiment of the present invention.
Figure 2:
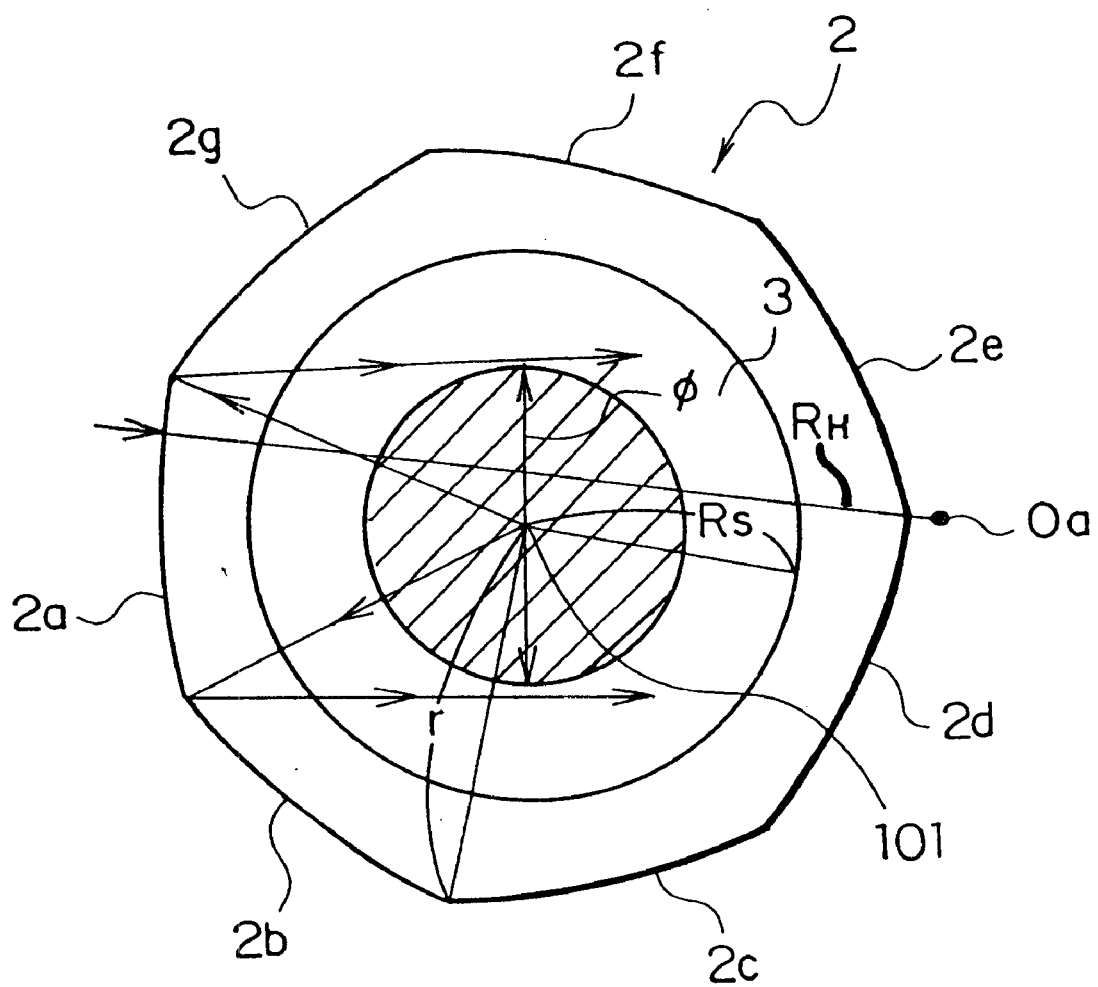
FIG. 2 is a view taken in a direction of an arrow A, showing the dark field illumination apparatus in FIG. 1.

The dark field illumination apparatus disposed inwardly of the base 51 includes, as shown in FIGS. 1 and 2, a light source 1, and annular reflective member 2 and a light shielding member 3. The light source 1 is disposed on an optical axis 101 of the objective lens 5. An inside surface of the annular reflective member 2 is a polygonal reflecting surface consisting of seven segments of reflecting surfaces 2a~2g each taking the same configuration, which are arranged in an annular shape (FIG. 2). The annular reflective member 2 is disposed so that the center of the annular reflective member 2 is coincident with the optical axis 101 of the objective lens 5.

The reflecting surfaces 2a~2g of the annular reflective member 2 are formed as concave surfaces each having a curvature radius $R_H$ within a plane perpendicular to the optical axis 101. Let r be a radius of a circle circumscribed to the polygonal reflecting surfaces 2a~2g, and the curvature radius $R_H$ of the reflecting surface is set such as $R_H \geq r$ (FIG. 2). Hence, the optical axis 101 is positioned, between the reflecting surface 2a and a curvature central position Oa of the concave surface of the reflecting surface 2a. With respect to other reflecting surfaces 2b~2g, the optical axis 101 is positioned closer to each of the reflecting surfaces 2b~2g than between each of the reflecting surfaces 2b~2g and a curvature central position thereof.

Further, each of the reflecting surfaces 2a~2g of the annular reflective member 2 takes an unvarying shape in a direction of a plane of incidence including the optical axis 101 (FIG. 1) but is not concave in this direction.

The light shielding member 3 is a circular plate member having a radius Rs and disposed inside the annular reflective member 2 so that its center is coincident with the optical axis 101. The radius Rs of the light shielding member 3 is determined in consideration of a length L of the annular reflective member 2 and a minimum operating distance WD and a maximum aperture angle $\Psi$ of the objective lens 5 so that the light shielding member 3 cuts off a beam of light, directly entering the objective lens 5, among beam of light emitted from the light source 1 and beams of light reflected by the reflecting surfaces 2a~2g of the annular reflective member 2.

Figure 6:
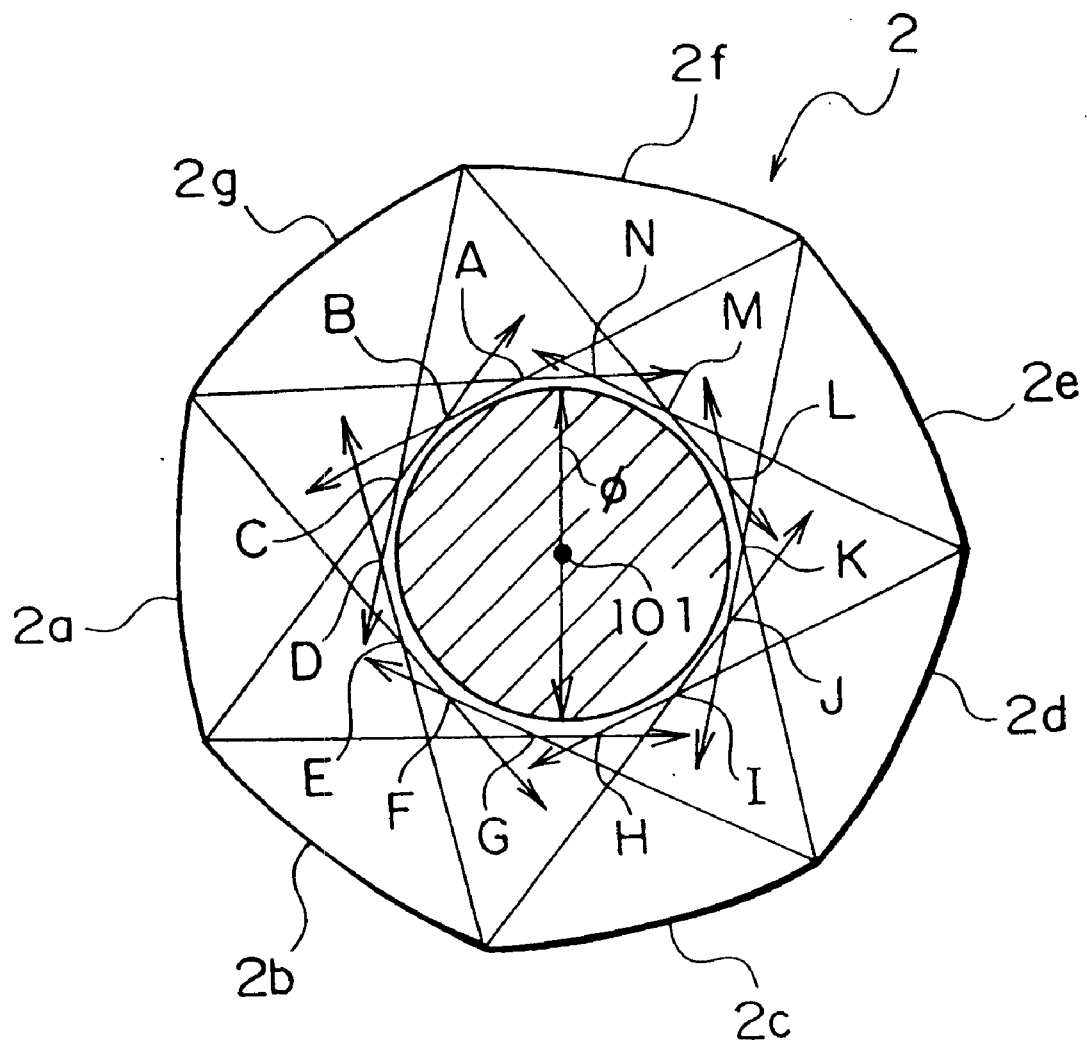
FIG. 6 is an explanatory view showing overlaps, on an inspected surface, of light beams reflected from reflecting surfaces 2a~2g of an annular reflective member 2 in the dark field illumination apparatus of the stereomicroscope in the first embodiment of the present invention as viewed in a direction perpendicular to the light axis 101.

In the thus constructed dark field illumination apparatus, the light source 1 is connected to a power source unit 52 and supplied with an electric current. Illumination light emitted from the light source 1 is, as shown in FIG. 1, regularly reflected by the reflecting surfaces 2a~2g of the annular reflective member 2 and incident on the inspected surface 4. At this time, the optical axis 101 (the center of the annular reflective member 2) is positioned between the reflecting surface 2a and the curvature central position 0a of the reflecting surface 2a, and hence, as viewed from above the inspected surface 4, the light beam regularly reflected by the reflecting surface 2a becomes the light beam having a width $\phi$ and falls upon the inspected surface 4 as shown in FIG. 2. Similarly, the light beam regularly reflected by each of the reflecting surfaces 2b~2g becomes the light beam having the width $\phi$ and falls upon the inspected surface 4. Hence, as shown in FIG. 6, seven beams of light fall overlapped with each other upon the inspected surface 4 with the optical axis 101 being centered, and an overlapped area turns to be a heptagonal area ABCDEFGHIJKLMN. An interior of this heptagonal area A~N has the overlaps of the seven beams of light and is therefore brightest with almost no ununiformity in illumination. Hence, sizes and curvatures $R_H$ of the reflecting surfaces 2a~2g of the annular reflective member 2 are determined so that a necessary illumination range, i.e., a maximum field range of the objective lens 5 on the inspected surface 4 becomes an inscribed circle to the heptagonal area A~N, whereby the illumination with no ununiformity can be attained by the regularly reflected light.

Further, as shown in FIG. 1, the regularly reflected light by the annular reflective member 2 is partially cut off by the light shielding member 3 on the plane including the optical axis 101, and therefore the regularly reflected light falls on the inspected surface in an oblique direction, with the result that the illumination light is not directly incident upon the objective lens 5. The dark field illumination can be thereby attained. Further, the radius r and the length L of the annular reflective member. 2 and the radius Rs of the light shielding member 3 are designed so that a diameter T of the reflected beam from the reflecting surface 2a when traveling across the inspected surface 4 is equal to or larger than a diameter $\phi$ of the inscribed circle to the heptagonal area A~N. The design is also the same with other reflecting surfaces 2b~2g. The illumination with no ununiformity can be thereby actualized by the regularly reflected light.

Hence, the interior of the inscribed circle having the diameter $\phi$ to the heptagonal area A~N of the inspected surface 4 is set as the illumination range, and the subject is placed within this illumination range, whereby only scattered light and diffracted light caused by the subject can be incident on the objective lens 5. An image of the scattered light and the diffracted light is formed by the zoom lens units and the image forming lens units. This :image is observed through the eyepieces 54, whereby an image of the dark field illumination can be observed. Further, focusing is conducted by vertically moving the zoom lens barrel 53 with the rotations of the knob 57. Moreover, it is possible to make zooming at a desired magnification with rotations of the knob 56.

The dark field illumination apparatus in the first embodiment is capable of illuminating the subjected with the regularly reflected light without any ununiformity, and hence a larger quantity of light than by the illumination with the scattered light can fall upon the subject at a high efficiency of the illumination. Therefore, even in the case of a subject exhibiting a small efficiency of occurrences of the scattered light and the diffracted light, it is feasible to increase the quantities of the scattered light and the diffracted light and to obtain a bright dark field image. This yields such an effect that a hyperfine structure and a transparent subject are easier to observe. Further, a less quantity of stray light than by the illumination with the scattered light enters the objective lens 5, and the dark field effect is not therefore decreased.

Note that if the annular reflective member 2 is constructed so that the reflected beams from the reflecting surfaces 2a~2g, as illustrated in FIGS. 2 and 6, fall in parallel or with a divergence as viewing the inspected surface 4 from the upper surface, it is easy to secure a large diameters $\phi$ of the illumination range. In order for the reflected beams to be incident in parallel or with the divergence, the curvature radius $R_H$ of each of the reflecting surfaces 2a~2g is designed to satisfy the following formula (1):

$$R_H \geq \phi/(2 \tan(\pi/(2n))) \quad (1)$$

where n is the number of the reflecting surfaces configuring the annular reflective member 2 and is herein given such as n=7.

Note that the maximum visual field of the objective lens 5, i.e., the maximum illumination range required is 32 mm ($\phi$=32 mm) in diameter on the inspected surface 4 in the first embodiment, and hence, when calculated from the above formula (1), the result is $R_H \geq 70.1$ mm. Taking into consideration of an eccentricity from the optical axis 101 of the annular reflective member 2 due to a fitting error of the light source 1, the curvature radius $R_H$ is set to 75 mm ($R_H$=75 mm) in the first embodiment. With this contrivance, as shown in FIGS. 1 and 2, the whole of the maximum illumination range $\phi$ required can be illuminated with the light, keeping the condition of the dark field illumination in which the illumination light is not directly incident upon the objective lens.

Further, it is desirable for irradiating the subject at a high efficiency with a much smaller quantity of ununiformity of the illumination that the reflected beams from the respective reflecting surfaces 2a~2g be, as shown in FIGS. 2 and 6, substantially the parallel light beams as viewing the inspected surface from the upper surface. This is actualized by designing the curvature radius $R_H$ of each of the reflecting surfaces 2a~2g and the radius r of the annular reflective member so as to let the optical axis 101 pass through focusing positions of the concave reflecting surfaces 2a~2g.

Note that the number of the reflecting surfaces of the annular reflective member 2 is set to 7 in the first embodiment, however, the number of the reflecting surfaces is not limited to 7 and may be set to any numerical values of 3 or greater.

The discussion on the first embodiment has been focused on only the dark field illumination apparatus as the illumination apparatus of the stereomicroscope, however, it is, as a matter of course, to take an architecture of providing a vertical illumination apparatus and a transmission illumination apparatus together with the dark field illumination apparatus.

(Second Embodiment)

The stereomicroscope having the dark field illumination apparatus in a second embodiment of the present invention will be explained. In the stereomicroscope in the second embodiment, a construction of the dark field illumination apparatus is different from that in the first embodiment. A whole construction other than this point is the same, and its repetitive explanation is omitted.

Figure 3:
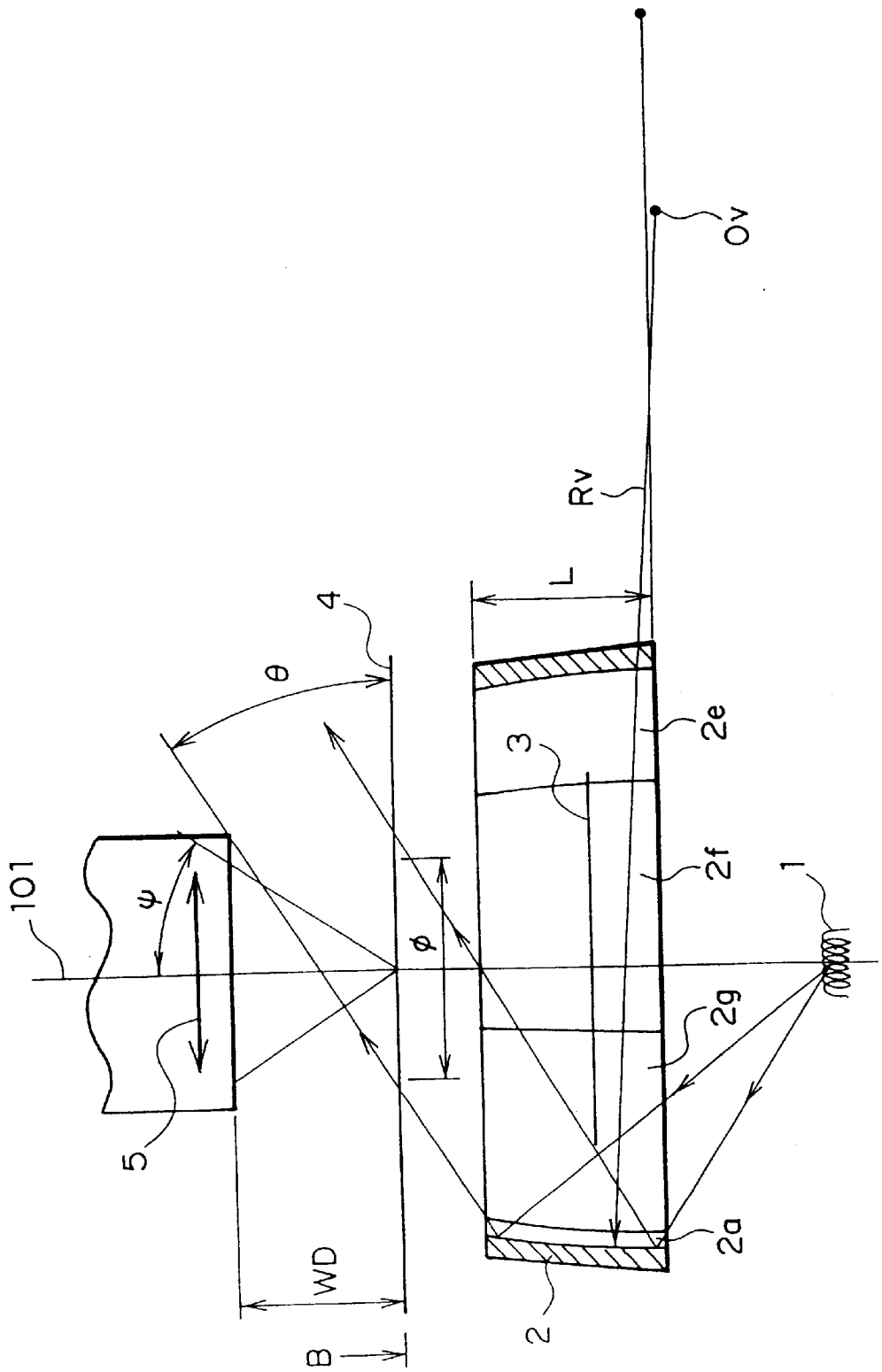
FIG. 3 is an explanatory view showing a configuration and light beam, as viewed from the plane including the optical axis 101, of the dark field illumination apparatus of the stereomicroscope in a second embodiment of the present invention.

The dark field illumination apparatus in the second embodiment, as shown in FIG. 3, includes the reflecting surfaces 2a~2g each formed as a concave surface having a curvature radius Rv in a direction of an incident plane including the optical axis 101. Besides, a position of a curvature center Ov of the concave surface in the direction of the incident plane containing the optical axis 101 is set closer to the light source 1 than a side end surface, on the side of the light source 1, of the annular reflective member 2. Hence, an inside diameter of the annular reflective member 2 is larger at a side end portion on the side of the light source 1 than at a side end portion on the side of the inspected surface 4.

Note that the annular reflective member 2 is formed as the concave surface having the curvature radius RH within the plane perpendicular to the optical axis 101 as in the first embodiment.

Thus, according to the second embodiment, the reflecting surfaces 2a~2g are formed so as to have the curvature of the concave surface in the direction of the incident plane containing the optical axis 101. Therefore, as shown in FIG. 3, an divergent angle of the reflected light from the reflecting surface 2a with respect to the plane including the optical axis 101 is smaller than a divergent angle in the first embodiment illustrated in FIG. 1. Further, the position of the curvature center Ov of the concave surface exists closer to the light source 1 than the side end surface on the side of the light source 1 of the annular reflective member 2. Hence, a maximum angle $\theta$ made by the reflected beam and the inspected surface 4 is also, as shown in FIG. 3, smaller than a maximum angle $\theta$ in the first embodiment.

Accordingly, the dark field illumination apparatus in the second embodiment is capable of attaining a configuration in which the illumination light does not directly fall on the objective lens 5 even when the minimum operating distance WD of the objective lens 5 is short without decreasing the length L of the annular reflective member 2, and is therefore capable of supplying the microscope having the high-magnification objective lens 5 with the dark field illumination exhibiting a large intensity of illumination.

In the dark field illumination apparatus in the second embodiment, the maximum angle $\theta$ and the curvature radius Rv are designed to satisfy the following formulae (2) and (3) in order for the illumination light not to directly enter the objective lens 5.

$$\theta \leq \tan^{-1}(2WD \cos \Psi/2WD \cdot \sin \Psi + \phi \cos \Psi) \quad (2)$$

$$|0.7R_H(1+\tan^2 \theta)| \leq Rv \leq |5R_H(1+\tan^2 \theta)| \quad (3)$$

where $\Psi$ is a maximum aperture angle of the object lens 5.

Figure 4:
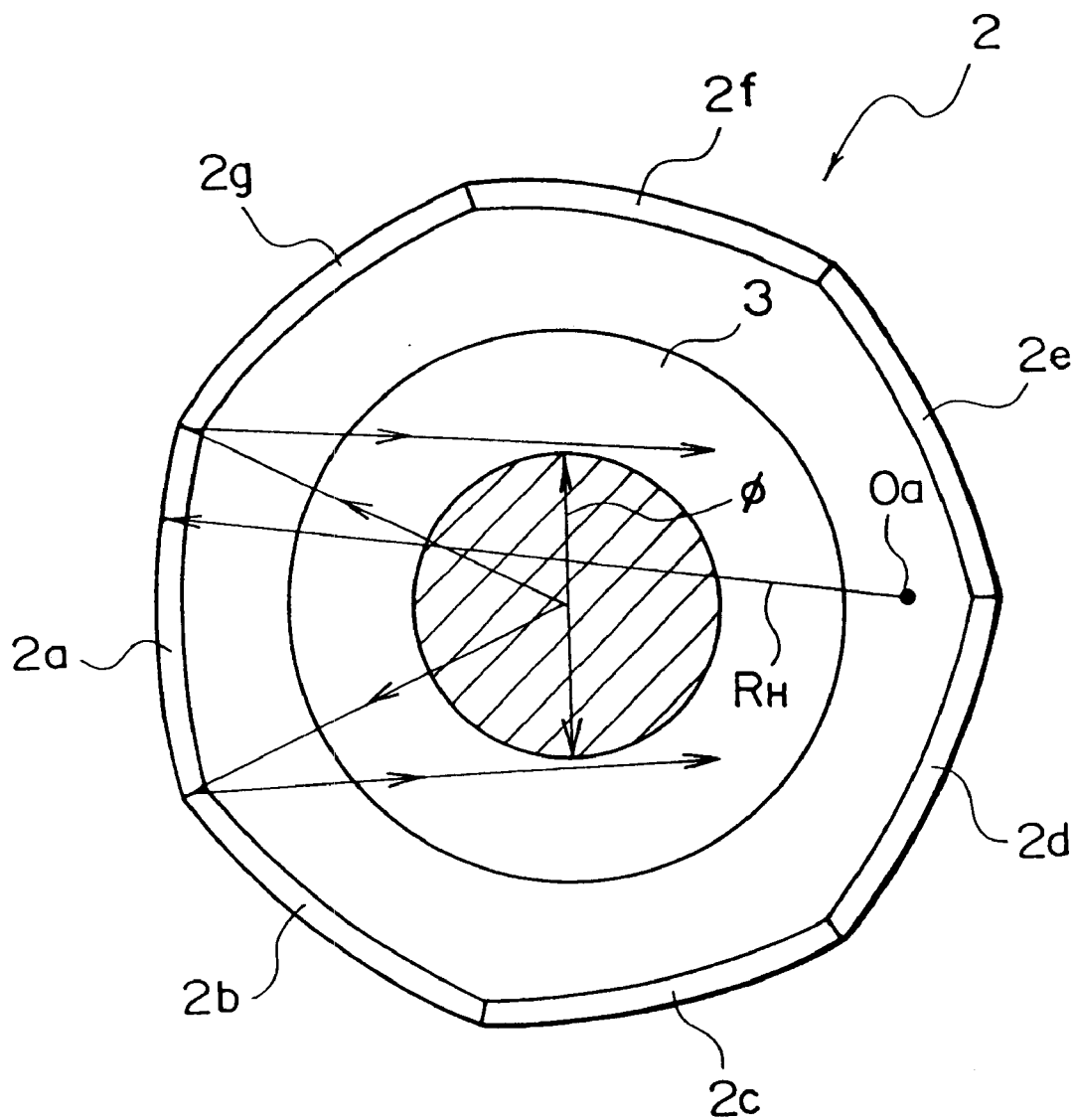
FIG. 4 is a view taken in a direction of an arrow B, showing the dark field illumination apparatus in FIG. 3.

Further, if the curvature radius Rv is designed to satisfy the following formula (4), the divergent light emitted from the light source 1 is reflected by the annular reflective member 2, with the result that the divergent beams become substantially the parallel light beams and are incident upon the inspected surface 4 with respect to the plane including the optical axis 101. The uniformity of the illumination in the illumination range having the diameter $\phi$ is thereby enhanced with respect to also the plane including the optical axis 101, and the ununiformity of the illumination can be reduced to much greater degree.

$$Rv=|R_H(1+\tan^2 \theta)| \quad (4)$$

where $\theta$ is given such as $\theta=\tan^{-1}$ (2WD cos $\Psi/(2WD \cdot sin \Psi + cos \Psi))$.

$$Rv=|R_H(1+\tan^2 \theta)| \quad (4)$$

where $\theta$ is given such as $\phi=\tan^{-1}$ (2WD cos $\Psi/(2WD \cdot \sin \Psi + \phi \cos \Psi))$ Further, in the dark field illumination apparatus in the second embodiment, the diameter $\phi$ of the maximum illumination range required is given such as $\phi$=32 mm, the minimum operating distance WD of the objective lens 5 is given such as WD=24 mm, and maximum aperture angle $\Psi$ is given such as $\Psi$=33.4°, and hence it becomes $\theta \leq 37°$ from the formula (2). When substituting this value and RH=75 mm determined based on the conditional formula (1) into the conditional formula (3), it can be understood that 82.4 mm $\leq$ Rv $\leq$ 588 mm is required to be met. Hence, according to the second embodiment, taking into consideration the eccentricity of the annular reflective member 2 from the optical axis 101 due to the fitting error of the light source 1, it is determined that Rv=150 mm. With this setting, as shown in FIGS. 3 and 4, the maximum illumination range $\phi$ required can be illuminated while securing the condition of the dark field illumination in which the illumination light does not directly fall on the objective lens.

Moreover, in the dark field illumination apparatus of the stereomicroscope in the second embodiment, the diameter, at the side end portion on the side of the light source 1, of the annular reflective member 2 is larger than the diameter at the side end portion on the side of the inspected surface 4. Therefore, when manufacturing the annular reflective member by use of a mold, there is obtained an effect that a removable gradient needed for removing the mold can be secured. Hence, the annular reflective member can be manufactured easily at a low cost without using a split mold etc.

As discussed above, the stereomicroscope in each of the first and second embodiments is capable of actualizing the dark field illumination with the less ununiformity of the illumination due to the regularly reflected light, and therefore the quantity of the illumination light can be augmented. This leads to the increases in the quantities of the scattered light and diffracted light, thereby making it possible to obtain the bright dark field image. With this effect, the hyperfine structure and the transparent subject can be observed with a high accuracy.

What is claimed is:

1. A stereomicroscope, comprising:
   an objective lens;
   a subject placing surface for placing a subject; and
   a dark field illumination apparatus disposed in such a position as to face the objective lens with the subject placing surface being interposed therebetween,
   wherein the dark field illumination apparatus includes a light source disposed on an optical axis of the objective lens, an annular reflective member having an inside surface for reflecting light from the light source, and a light shielding plate for partially cutting off light reflected by the annular reflective member, and
   the inside surface of the annular reflective member takes such a configuration that a plurality of reflecting surfaces, each taking a concave shape and each having a same predetermined radius of curvature, are disposed in an annular shape with the optical axis being centered within a plane perpendicular to the optical axis, and the optical axis is positioned between each of the plurality of reflecting surfaces and each corresponding center of the predetermined radius of curvature thereof.

2. A stereomicroscope according to claim 1, where a diameter of an area in which the light beams passing said light shielding plate are overlapped with each other is larger than a diameter of an illumination range required.

3. A stereomicroscope according to any one of claims 1 or 2, wherein the predetermined radius of curvature of each of said plurality of reflecting surfaces is determined so that light beams emitted from the light source and reflected by the plurality or reflecting surfaces become parallel light beams as viewed from a plane perpendicular to the optical axis.

4. A stereomicroscope according to claim 3, wherein each of the plurality of concave reflecting surfaces have a same predetermined radius of curvature also with in a plane including the optical axis, and
   a first inside diameter of the annular reflective member positioned at a first end portion adjacent to the light source is larger than a second inside diameter of the annular reflective member disposed at a second end portion distal from the light source and adjacent to the subject placing surface.

5. A stereomicroscope according to claim 4, wherein a curvature center of the concave shape of each of the plurality of reflecting surfaces in a direction of an incident plane including the optical axis is set closer to the light source than an end surface of the reflecting member that is adjacent to the light source.

6. A stereomicroscope according to claim 5, wherein the curvature radius Rv of the concave shape of each of the plurality of reflecting surfaces of the reflecting member in the direction of the incident plane including the optical axis is determined to satisfy the following formula:

$$Rv = |R_H(1+\tan^2 \theta)|$$

where θ satisfies $$\theta \leq \tan^{-1}(2WD \cos \Psi/(2WD \sin \Psi + \phi \cos \Psi))$$

wherein $R_H$ is the predetermined radius of curvature of each of the plurality of concave reflecting surfaces, φ is a width of a light beam reflected from one of the plurality of concave reflecting surfaces, θ is a maximum angle between a light beam reflected from the one of the concave reflecting surfaces and the subject placing surface, Ψ is a maximum aperture angle of the objective lens, and WD is a minimum operating distance of the objective lens.

7. A stereomicroscope according to claim 4, wherein the annular member has two openings at the respective ends, one of the two openings being smaller than the other one, and the light source is disposed outside of the larger opening side of the annular reflective member so that light from the light source enters the annular reflective member and is reflected by the reflecting surfaces thereof and comes out through the smaller opening.

8. A stereomicroscope according to claim 1, wherein the following relationship is satisfied:

$$R_H \geq r$$

wherein $R_H$ represents a predetermined radius of curvature of each of the plurality of concave reflecting surfaces, and r represents a radius of a circle circumscribed to the plurality of concave reflecting surfaces.

9. A stereomicroscope according to claim 8, wherein the predetermined radius of curvature $R_H$ of each of the plurality of concave reflecting surfaces is determined to satisfy the following formula:

$$R_H \geq \phi/(2 \tan(\pi/(2n)))$$

wherein φ is a width of a light beam reflected from one of the plurality of concave reflecting surfaces, and n is a total number of the plurality of concave reflecting surfaces.

10. A stereomicroscope according to claim 9, wherein n is 3 or more.

11. A dark field illumination apparatus, comprising:
   a light source disposed on an optical axis of an objective lens;
   an annular reflective member having an inside surface for reflecting light from the light source; and
   a light shielding plate for partially cutting off light reflected by the annular reflective member,
   wherein the inside surface of the annular reflective member takes such a configuration that a plurality of reflecting surfaces, each taking a concave shape and each having a same predetermined radius of curvature, are disposed in an annular shape with the optical axis being centered within a plane perpendicular to the optical axis, and the optical axis is positioned between each of the plurality of reflecting surfaces and each corresponding center of the predetermined radius of curvature thereof.

* * * * *